United States Patent [19]

Schofield et al.

[11] Patent Number: 5,193,133
[45] Date of Patent: Mar. 9, 1993

[54] METHOD OF TERMINATING OPTICAL FIBER UTILIZING A PLASTIC ALIGNMENT FERRULE WITH POLISHING PEDESTAL

[75] Inventors: Philip W. Schofield, Batavia; Paul R. Stonikas, Darien; James W. McGinley, Schaumburg, all of Ill.

[73] Assignee: Methode Electronics, Inc., Chicago, Ill.

[21] Appl. No.: 823,305

[22] Filed: Jan. 21, 1992

[51] Int. Cl.⁵ .......................... G02B 6/26; B29D 11/00
[52] U.S. Cl. .......................................... 385/85; 385/76; 385/77; 385/78; 385/80; 264/1.1; 264/1.5
[58] Field of Search .................... 385/76, 77, 78, 80, 385/85; 51/283 R, 283 E, 298; 225/93, 94; 264/1.1, 1.2, 1.5, 2.7; 65/61

[56] References Cited

U.S. PATENT DOCUMENTS

| | | |
|---|---|---|
| 4,084,308 | 4/1978 | Runge .................................. 385/85 |
| 4,303,304 | 12/1981 | Ruiz .................................. 385/85 X |
| 4,362,356 | 12/1982 | Williams et al. ...................... 385/85 |
| 4,367,011 | 1/1983 | Monaghan ........................ 385/85 X |
| 4,512,630 | 4/1985 | Runge .................................. 385/73 |
| 4,634,214 | 1/1987 | Cannon, Jr. et al. ................. 385/86 |
| 4,648,688 | 3/1987 | Ashman et al. ...................... 385/85 |
| 4,666,241 | 5/1987 | Caron .................................. 385/85 |
| 4,812,009 | 3/1989 | Carlisle et al. ...................... 385/62 |
| 4,991,929 | 2/1991 | Bowen et al. ....................... 385/50 |

Primary Examiner—Brian Healy
Attorney, Agent, or Firm—Allegretti & Witcoff, Ltd.

[57] ABSTRACT

An injection molded plastic fiber alignment ferrule is provided with a polishing pedestal. The ferrule has an opening therethrough for receiving the end of a fiber, which extends beyond the pedestal. The fiber is cleaved and the end is severed. The ferrule is polished to remove the pedestal, resulting in a smoothly polished end surface.

5 Claims, 1 Drawing Sheet

U.S. Patent    Mar. 9, 1993    5,193,133
Fig.1
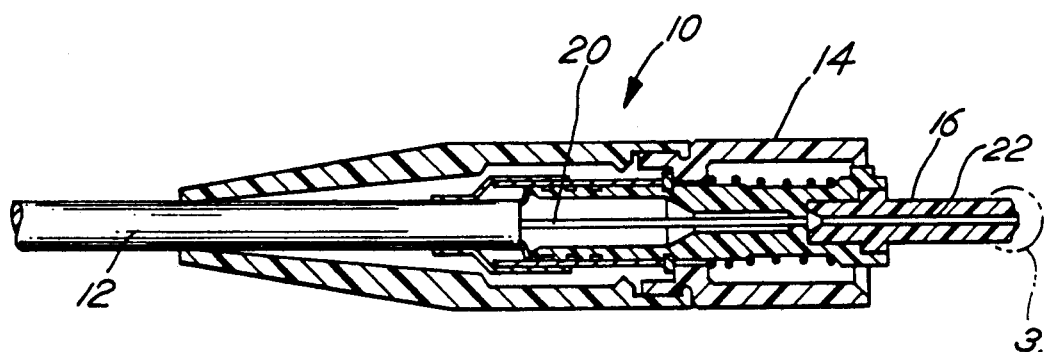
Fig.2
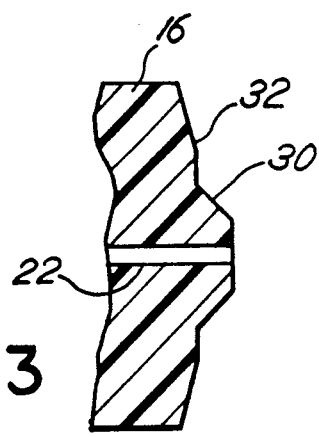
Fig.3
Fig.4  Fig.5  Fig.6
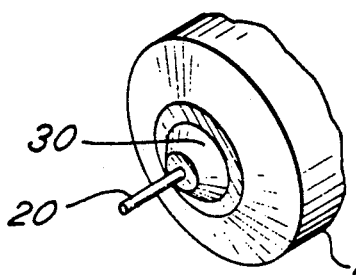 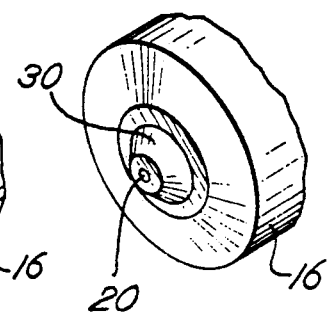 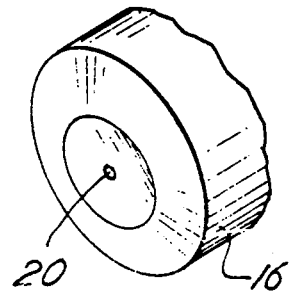

METHOD OF TERMINATING OPTICAL FIBER UTILIZING A PLASTIC ALIGNMENT FERRULE WITH POLISHING PEDESTAL

BACKGROUND OF THE INVENTION

The invention pertains to fiber optical connectors, and more particularly, to an alignment ferrule for a fiber optical connector made from injection molded plastic having a pedestal projecting from an end surface of the ferrule for receiving and surrounding a fiber, the pedestal being readily removed by polishing, after bonding of the fiber to the ferrule to leave a smoothly polished end surface on the ferrule. In other aspects, this invention pertains to a method of making a plastic ferrule with a raised pedestal at one end and to a method of making a fiber optical connector using an injection molded plastic ferrule with a raised pedestal at one end.

It is known in the art to make a fiber optical connector by securing a fiber optic cable to a ceramic or plastic ferrule. The ferrule is generally cylindrical and has an opening extending therethrough. The opening has a diameter slightly larger than the diameter of the fiber. The fiber, which protrudes from an end of the cable, is inserted through the opening in the ferrule and bonded to the ferrule by use of an adhesive, for example, an epoxy. A drop of epoxy is usually applied to the fiber exterior of the opening to protect the end of the fiber. The end of the fiber protruding from the ferrule and the epoxy is cleaved using a diamond tipped tool. The end of the ferrule is then polished. Epoxy surrounding the fiber adjacent the end of the ferrule causes difficulty in locating the cleave position. The fiber can be severed at different distances from the end of the ferrule. The fiber might undesirably break below the end surface of the ferrule. Since it is difficult to predict how the fiber will be severed after it is cleaved, proper polishing of the ferrule end is a problem.

With a ceramic ferrule, expensive abrasives must be used to grind and polish the end of the ferrule. The cost of the ceramic material in a ferrule and the processing of same is considerably more than the cost of a plastic ferrule and its processing, hence, it would be desirable to utilize a relatively inexpensive plastic. Further, it is desired to automate the process of assembling an optical fiber to a ferrule. Present ferrules of either ceramic or plastic do not have a relatively fixed point of extension of the fiber from the ferrule during assembly and thus do not lend themselves readily to automation.

Runge U.S. Pat. No. 4,512,630 discloses an optical fiber connector utilizing a pair of connectors each having a tiny transparent flexible index matching dome of silicone rubber or equivalent material. The connectors have conically hollow receiving surfaces. The fiber ends are aligned and the domes touch and flex completing the optical connection. It is difficult to break the fiber to achieve a flat and perpendicular end face and thus degradation of the connection between the aligned fibers often results.

An object of the present invention is to provide a molded plastic ferrule for a fiber optic connector having a raised pedestal at one end which is integral with the ferrule, is inexpensive to make and which overcomes disadvantages and deficiencies of prior ferrules.

Another object of the present invention is to provide an injection molded plastic ferrule for a fiber optic connector which includes a raised pedestal at one end having a height at least equal to the diameter of the fiber for facilitating assembly of the ferrule and fiber, with the end of the fiber located closely proximate the end surface of the ferrule, whereby the end of the ferrule can be easily polished to remove the pedestal and form a uniformly polished end surface.

Yet another object of this invention is to provide a molded plastic 2.5 mm ferrule for a fiber optic connector having a raised pedestal adjacent one end surrounding the fiber, for facilitating manufacture of the ferrule with a uniformly polished end surface. Other objects and advantages of this invention will be made more apparent hereinafter.

BRIEF DESCRIPTION OF THE DRAWING

There is shown in the attached drawing a presently preferred embodiment of the present invention, wherein like numerals in the various views refer to like elements, and wherein:

FIG. 1 is a perspective view of fiber optical connector embodying the present invention;

FIG. 2 is a longitudinal cross section of the fiber optical connector of FIG. 1;

FIG. 3 is an enlarged detail view of an end of the ferrule of the fiber optical connector prior to polishing and illustrating the raised pedestal, which surrounds the outlet end of the opening through the ferrule;

FIG. 4 is a detail perspective view illustrating the position of the fiber in the ferrule at the beginning of assembly of the fiber to the ferrule;

FIG. 5 is a detail perspective view illustrating the fiber cleaved at the pedestal surface; and FIG. 6 is a detail perspective view illustrating the end of the ferrule after polishing is complete and the pedestal is removed.

DETAILED DESCRIPTION OF THE PRESENT INVENTION

Referring to FIGS. 1 and 2, there is shown a fiber optic connector 10 for cable 12 which includes within housing 14 the plastic ferrule 16 of the present invention. The cable 12 is of conventional construction and includes a protective coating or jacket 18 surrounding strain members (not shown) and fiber 20, which fiber is secured within ferrule 16, as will be more fully explained hereinafter.

The ferrule 16 is injection molded, preferably from a partially glass filled or mineral filled resin, such as polyphenylene sulfide (PPS) or liquid crystal polymer (LCP). The ferrule 16 is relatively inexpensive as compared to a ceramic ferrule. The ferrule 16 has a longitudinal opening or passage 22 therethrough. The entry end of the opening 22 is tapered to facilitate entry of the fiber 20 during assembly of the fiber within the ferrule.

Ordinarily, known ferrules are formed with a flat end surface. A 2.5 mm ferrule is currently standard in the industry. An adhesive, such as epoxy, is introduced into the opening in the ferrule. The fiber from the end of the cable is inserted into the opening in the ferrule until it extends from the end surface of the ferrule. The epoxy bonds the fiber to the ferrule. The fiber is cleaved or cut off as close as possible to the end surface. The epoxy may surround the fiber sticking out from the end surface of the ferrule making cleaving close to the end surface difficult. The fiber could undesirably shear below the end surface. Polishing the end of the ferrule to bring the fiber to the end surface can be difficult and often results in undesirably polishing away more ferrule than is needed or desired. Adhesive beads have been known to shear away from the ferrule and surface during polishing.

To overcome these problems, the ferrule 16 of the present invention is injection molded with a pedestal 30 extending outwardly from the end surface 32. The pedestal 30 is annular and surrounds the opening 22 in ferrule 16. Preferably, the height of the pedestal 30 is at least equal to the diameter of the fiber 20, and preferably the height is twice the diameter of the fiber 20. The pedestal 30 provides a consistent and dependable support for the fiber 20 while polishing.

Turning to FIGS. 4–6, there is better shown the method of connecting a fiber to a ferrule. FIG. 4 illustrates a ferrule 16 of this invention made with a pedestal 30. In the assembly process, the optical fiber is stripped by removing its buffer for a distance of ⅛ inch to ¼ inch of the end. The stripped portion of the fiber 20 precedes the buffered portion in entering the rear of the ferrule 16 during the assembly operation. The fiber 20 is epoxied into the ferrule 16, with the free end of the fiber 20 extending beyond the pedestal 30.

The fiber 20 is cleaved adjacent the surface 40 of the pedestal 30 using a diamond or like tipped tool. The free end of the fiber 20 is broken away. The fiber 20 is substantially at the surface 40, as seen in FIG. 5. To remove the fiber 20 above the pedestal, apply a piece of abrasive, e.g., 12 micron lapping film over the fiber 20 and lightly complete 10–15 small circular strokes.

The ferrule 16 is inserted into a fixture comprising a generally circular base of substantial diameter (on the order of 1 to 1½ inches), with a cylinder extending from the base. The cylinder has a hole for receiving the ferrule 16. The fixture is positioned over an abrasive sheet on the order of 10–12 microns. The abrasive sheet preferably comprises an aluminum oxide film. The end of the ferrule 16 engages the abrasive sheet. The fixture is moved to make about 20 revolutions or circular strokes to remove the raised pedestal 30. The end surface of ferrule 16 is cleaned with alcohol. Then polishing completed by placing a sheet of 0.3 micron abrasive and completing 5–10 circular strokes approximately 2 inches in diameter.

If a rounded end is desired on the ferrule, the abrasive sheet may be positioned on a resilient surface, e.g., a sheet of rubber. If a flat end is desired on the ferrule, the abrasive sheet may be positioned on a relatively hard surface, e.g., a glass plate. In any case, the resultant surface finish on the end surface of the injection-molded ferrule is at least equal to that of the finish on a ceramic ferrule, at a small fraction of the price of the ceramic ferrule.

The polished end surface of the ferrule can be relatively easily held at a fixed distance from the opposite end of the ferrule. This permits the ferrule of the present invention to be more readily adapted to automated manufacture of a connector. The pedestal feature eliminates the need for an epoxy bead, therefore reducing the installation time, as well as the scrap. Further, the pedestal 30 reduces the amount of expensive lapping film consumed by reducing the amount of ferrule material to be removed in the polishing process.

The present invention is easily adapted for the standard 2.5 millimeter ferrule in use commercially. Though the connector is shown with a single ferrule, it is understood that the invention can readily be used with connectors having multiple ferrules and fibers.

While we have shown a presently preferred embodiment of the present invention, it will be understood that various changes and modifications may be made in the invention and it is intended that the invention will be limited only within the scope of the appended claims.

We claim:

1. A method of making a fiber optic connector comprising the steps of forming a plastic ferrule comprising an elongated body having an opening therethrough, said opening having an entry end and an exit end, said opening being flared at the entry end for facilitating entry of a fiber, said ferrule having a raised pedestal surrounding the exit end of the opening, introducing a fiber into said opening for extension through said exit end and beyond said raised pedestal, bonding said ferrule to said fiber, cleaving the fiber, severing the free end of the fiber, and polishing the ferrule to remove the raised pedestal and provide a smoothly polished end surface on the ferrule.

2. A method as in claim 1 including the step of applying an adhesive to the opening before introducing the fiber and bonding the fiber to the ferrule after introducing the fiber.

3. A method as in claim 1 including the step of applying an epoxy to the opening before introducing the fiber and bonding the fiber to the ferrule.

4. A method as in claim 1 wherein the ferrule is formed by injection molding a partially glass filled resin.

5. A method as in claim 1, wherein the ferrule is formed by injection molding a partially carbon filled resin.

* * * * *